(12) United States Patent
Wong et al.

(10) Patent No.: US 7,539,659 B2
(45) Date of Patent: May 26, 2009

(54) MULTIDIMENSIONAL TIMELINE BROWSERS FOR BROADCAST MEDIA

(75) Inventors: Curtis G. Wong, Medina, WA (US); Dale A. Sather, Seattle, WA (US); Kenneth Reneris, Clyde Hill, WA (US); Thaddeus C. Pritchett, Edmonds, WA (US); Eric J. Horvitz, Kirkland, WA (US); Talal Ali Batrouny, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 11/764,028

(22) Filed: Jun. 15, 2007

(65) Prior Publication Data

US 2008/0313127 A1 Dec. 18, 2008

(51) Int. Cl.
- G06F 15/18 (2006.01)
- G06F 15/00 (2006.01)
- G06F 3/00 (2006.01)
- G06F 13/00 (2006.01)
- H04N 5/445 (2006.01)

(52) U.S. Cl. .......................................... 706/62; 725/46
(58) Field of Classification Search ................... 725/46; 706/45, 62; 707/231, E17.028, E17.009
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 7,006,881 B1 * | 2/2006 | Hoffberg et al. | 725/41 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |

(Continued)

OTHER PUBLICATIONS

Andy Harter, et al., A Distributed Location System for the Active Office, IEEE Network, 1994, pp. 62-70.

(Continued)

Primary Examiner—David R Vincent
Assistant Examiner—Benjamin Buss
(74) Attorney, Agent, or Firm—Amin, Turocy & Calvin, LLP

(57) ABSTRACT

The claimed subject matter provides a system and/or method that effectuates selective viewing of multimedia audio and/or visual content. The disclosed system can include a component that obtains multimedia audio or visual content from a broadcast server, categorizes the multimedia audio or visual content, and associates index tags to categorized multimedia audio or visual content. The index tags are utilized to provide a facility to search or summarize the categorized multimedia audio or visual content, wherein the resultant searches and summarizations can be displayed on a display associated with the component.

20 Claims, 8 Drawing Sheets

U.S. PATENT DOCUMENTS

| | | | |
|---|---|---|---|
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2004/0153445 | A1* | 8/2004 | Horvitz et al. ............ 707/3 |
| 2005/0034078 | A1 | 2/2005 | Abbott et al. |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

MULTIDIMENSIONAL TIMELINE BROWSERS FOR BROADCAST MEDIA

BACKGROUND

In order to remain competitive in the home entertainment industry, manufacturers and service providers are increasing efforts to develop improved entertainment systems. A rapidly evolving type of entertainment system relates to a personal video recorder system. A personal video recorder system includes a large digital data storage device, such as a hard disk drive, for storing recorded audio and/or video programming in a digital format (without a videotape). The storage device enables the viewer to efficiently implement a time shifting function so that the viewer can watch the recorded program at a more convenient time. The personal video recorder system receives broadcast programs from a service provider, such as in the form of cable television, satellite, or other source of programming. The personal video recorder system also may employ a video compression system (e.g., an MPEG-2 format) in combination with an analog to digital converter for converting analog broadcast signals into a suitable digital format. Alternatively and/or additionally, the personal video recorder system may receive broadcast signals in digital format.

Locating missed episodes from a serial multimedia presentation can be extremely problematic and frustrating for most uses of personal video recorder systems. For example, users when faced with attempting to catch up with missed episodes have to date been consigned to locating summaries provided, for example, by program guides. Nevertheless, these summarizations typically do not effectively relate or stimulate patterns of memorability necessary to engender recall the missed or forgotten episodes.

SUMMARY

The following presents a simplified summary in order to provide a basic understanding of some aspects of the disclosed subject matter. This summary is not an extensive overview, and it is not intended to identify key/critical elements or to delineate the scope thereof Its sole purpose is to present some concepts in a simplified form as a prelude to the more detailed description that is presented later.

A foundational concept of multidimensional timeline browser technologies (e.g., life browser technologies) is that certain events are more memorable than others. Accordingly, multidimensional timeline techniques can associate videos, photos, e-mail messages, documents, and any other type of digital file, to landmark events. For example, multidimensional timeline technologies can be utilized to display only stored photos, and videos taken during a birthday party.

Features of multidimensional timeline techniques can be applied to personal video recorders where memorable events can be events that take place on screen. For example, if a user misses an episode of a show, but wants to catch-up, they can ask, "what happened right after Joseph and Chuck stole the car and drove to Mexico?" Systems and methods that employ multidimensional timeline techniques can deliver a summary of all important events that relate to Joseph and Chuck's escape, and can relate these unseen events to events that the user has already seen.

Moreover, various individuals may deem different aspects of a common on-screen event as memorable. For example, in a single scene one user may have a strong affinity to a particular actor while another user to a different actor. Multidimensional timeline techniques can tailor recording, indexing, playback, etc. of viewing content as a function of what is and what is not memorable to a particular user. Real-life personal events (e.g., who one was watching a show with, etc.) can also be leveraged to enhance a content viewing/navigation experience.

The claimed subject matter in accordance with an aspect of the claimed subject matter relates to a system that effectuates selective viewing of multimedia audio or visual content. The system can include a component that receives multimedia audio or visual content, categorizes the received multimedia audio or visual content, and associates index tags to categorized multimedia audio or visual content. The index tags employed to provide dynamic search and summarization functionalities, wherein results of searches and summarizations can be displayed on an associated visual display.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
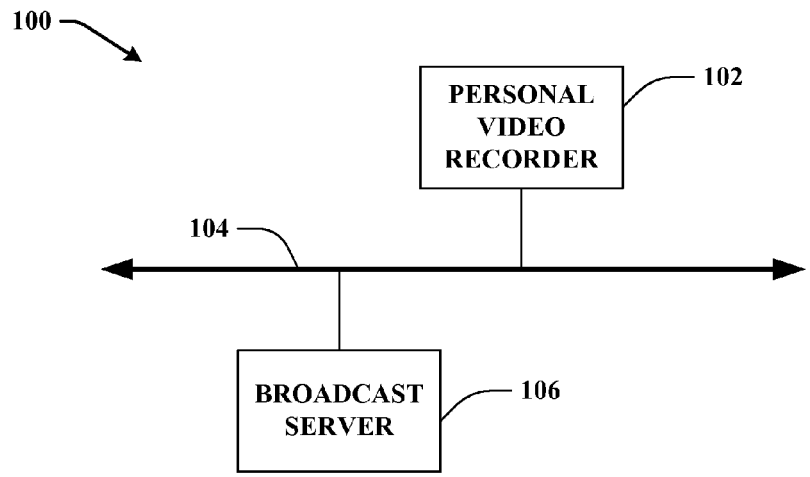
FIG. 1 illustrates a machine-implemented system that effectuates and facilitates the selective viewing of multimedia content in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

FIG. 1 depicts an illustrative system 100 that effectuates and facilitates viewing of multimedia audio/visual content. System 100 can include personal video recorder 102, a device and/or component that plays back and/or records multimedia audio/visual content to storage media (e.g., volatile and/or non-volatile memory that can be electronically erased and/or programmed, non-volatile storage that persist digitally encoded data on rapidly rotating platters with magnetic and/or optically retentive surfaces and/or coatings, and/or magnetic tape). Personal video recorder 102 can be a standalone set-top box, or a portable recording and/or playback device. Additionally, personal video recorder 102 can be implemented entirely in software, hardware, and/or a combination of software and/or hardware. Further, personal video recorder 102 can be incorporated within and/or associated with other compatible components, such as for instance, televisions, devices and/or appliances that can include processors (e.g., desktop computers, laptop computers, notebook computers, cell phones, smart phones, Personal Digital Assistants (PDAs), multimedia Internet enabled mobile phones, multimedia players, and the like). As depicted, personal video recorder 102 can be in continuous and operative, or sporadic and intermittent communication via network topology 104 with broadcast server 106.

Network topology 104 can include any viable communication and/or broadcast technology, for example, wired and/or wireless modalities and/or technologies can be utilized to effectuate the claimed subject matter. Moreover, network topology 104 can include utilization of Personal Area Networks (PANs), Local Area Networks (LANs), Campus Area Networks (CAMs), Metropolitan Area Networks (MANs), extranets, intranets, the Internet, Wide Area Networks (WANs)—both centralized and distributed—and/or any combination, permutation, and/or aggregation thereof.

Broadcast server 106 can be any type of machine that includes a processor and is capable of effective communication with network topology 104. Machines and/or services that can comprise broadcast server 106 can include desktop computers, server class computing devices, cell phones, smart phones, laptop computers, notebook computers, Tablet PCs, consumer and/or industrial devices and/or appliances, hand-held devices, Personal Digital Assistants (PDAs), multimedia Internet mobile phones, and the like. Additionally, broadcast server 106 can include broadcast stations that broadcast, simulcast, and/or multicast audio and/or video multimedia content. Further, broadcast server 106 can be an implementation of a low-power television broadcast translator that retransmits and/or rebroadcasts content to personal video recorder 102, for example.

Personal video recorder 102 can receive multimedia audio/visual content and/or presentations (e.g., audio/visual fragments, segments, chapters, clips, series, miniseries, telenovelas, episodic presentations, serial stories, plays, podcasts, and the like) from broadcast server 106 via one or more transmission means provided by network topology 104. Once personal video recorder 102 is in receipt or has obtained media content (e.g., polled broadcast server 106 for transmission of multimedia audio/visual content), personal video recorder 102 can either persist obtained and/or received content to associated storage media for subsequent analysis, or personal video recorder 102 can contemporaneously and/or concurrently—while the multimedia presentation is being broadcast, simulcast, and/or multicast—perform analysis and/or examination of received and/or obtained media content for immediate and/or subsequent presentation to individuals utilizing personal video recorder 102, and storage to storage media affiliated with personal video recorder 102 and/or persisting means that can be dispersed across the extent of network topology 104 (e.g., a data warehouse site, etc.).

Personal video recorder 102 can solicit data/information from individual users of personal video recorder 102. Such data/information can be employed to gauge and/or infer each user's unique likes and/or dislikes, memorable events, and mnemonic devices appurtenant and appropriate to each user (e.g., memory associations and/or stimuli singularly unique to each user that elicits a positive and/or negative cognitive response from the user). Personal video recorder 102 can further utilize multidimensional timeline techniques. Multidimensional timeline techniques are based on the concept that certain events are more memorable than others. Accordingly, multidimensional timeline techniques can dynamically and automatically associate videos, photographs, e-mail messages, documents, and any other type of digital file to landmark events. For example, multidimensional timeline techniques, and in particular multidimensional timeline browsers (e.g., browsers that utilize multidimensional timeline techniques), can search for, identify and display all photographs, and/or videos that were taken during a particular event, for instance, Aunt Edith's 95th birthday party. Similarly, multidimensional timeline techniques can be applied to personal video recorders where memorable events can be those situations that take place during the course of audio/visual presentations, and that particularly appeal to an individual's specific sensibilities. For example, in a scene where two individuals escape from a spaceship, one section of an audience may recall the scene merely as: "Janet and John escaped from the Galactic Battle Cruiser before it exploded". In contrast, another section of the audience may recall the scene in a totally different light, for instance: "when John, his biceps rippling and straining, his long mane of tangerine colored hair wafting gently behind him, lifted the waiflike Janet over the threshold of the Galactic Battle Cruiser so that both could make good their escape and live happily ever after". As will be appreciated from the foregoing illustration, patterns of memorability can differ between individuals, and accordingly mnemonic devices and techniques needed to stimulate memories can vary significantly between persons. Accordingly, personal video recorder 102 can employ one of artificial intelligence and/or machine learning modalities and/or components to ascertain appropriate and/or significant memorability triggers and/or devices specific to each individual user of personal video recorder 102. Additionally, personal video recorder 102 can utilize external sources and/ or internal and/or external persisting means and/or databases to infer and/or ascertain individual memorability preferences.

Personal video recorder 102, based at least in part on elicited (e.g., via one or more command line and/or graphical interfaces) user information, direct, indirect, and/or deduced through utilization of multidimensional timeline techniques, artificial intelligence and/or machine learning methodologies, devices, and/or components, internally and/or externally persisted, or concurrently, derived, inferred, procured, or constructively inferred sources (e.g., databases, data structures, such as, tables, queues, stacks, trees, and the like), and received and/or obtained broadcast, simulcast, and/or multicast audio/visual content, can annotate, inscribe, and/or associated tags to discrete segments of the obtained and/or received audio/visual content. Tags, for example, can be metadata that imposes a hierarchical arrangement, ontology (e.g., a data model that represents a set of concepts within a domain and the relationships between those concepts) and/or schema (e.g., a format that defines the structure, content, and/or semantics of a tag). Tags can be recursively definable and can further include use of, for example, indexes, linked lists, binary and/or multiway trees, and the like, to expedite access and/or storage of multimedia content, as well as, annotated, inscribed, and associated tags. Depending on implementation, tags can be incorporated together with or included with associated media content for ease of access and presentation. Alternatively and/or additionally, tags can be persisted separately from the media content to which they pertain and can be dynamically stitched, combined, and/or merged with media content during performance or playback.

Information included and/or associated with each tag and affiliated with discrete segments of obtained and/or perceived audio/visual content can include elicited user responses, derived and/or inferred memorable events ascertained through utilization of multidimensional timeline technologies specific to individual users of personal video recorder 102, and/or dynamically involving profiles of inferred and/or deduced memorable events. For example, an individual's sensibilities evolve other time, for instance, a male may enjoy slapstick and/or gutter humor during his adolescent years, but over time his sensibilities can shift towards more cerebral types of humor. Thus, tags can maintain (e.g., through use of linked lists) a history of this evolution, for example.

Additionally, personal video recorder 102 can provide concurrent summary of received and/or obtained broadcast, simulcast, and/or multicast multimedia content (e.g., multimedia segment, partition, episode, series, chapter, and the like). Such a facility can be achieved, for example, through utilization of associated tags and information contained therein. Further, the contemporaneous, dynamic and automatic summarization facility can provide summaries based on individual memorability criteria. For example, user T may have a memorability profile that indicates a preference for cerebral mnemonic devices, whereas user C may have a memorability profile indicative for the use of more romantic devices.

Further, personal video recorder 102, when media content has not been previously persisted to storage media, can persist multimedia content together with inferred, obtained, and/or deduced data included and/or incorporated within tags and/or tokenized schema, etc. to one or more internal and/or external storage device. Illustrative storage media can include volatile and/or nonvolatile memory or storage media as discussed supra.

Personal video recorder 102 can also include playback instrumentalities wherein annotated, tagged, and/or persisted media content can be presented to the user of personal video recorder 102. For example, media content can be presented via a visual display device associated with personal video recorder 102. Personal video recorder 102 can further provide summaries of persisted media content specifically adapted to each individual user of personal video recorder 102, based, for example, at least in part, on dynamically evolving memorability profiles associated with each individual user of personal video recorder 102. Additionally, where multiple users are utilizing personal video recorder 102 (e.g., in a nuclear family situation) personal video recorder 102 can employ memorability models from each family member to dynamically generate a composite summary appropriate for the family unit as a whole, but yet ensuring that each member's particular memorability profile is catered for.

Figure 2:
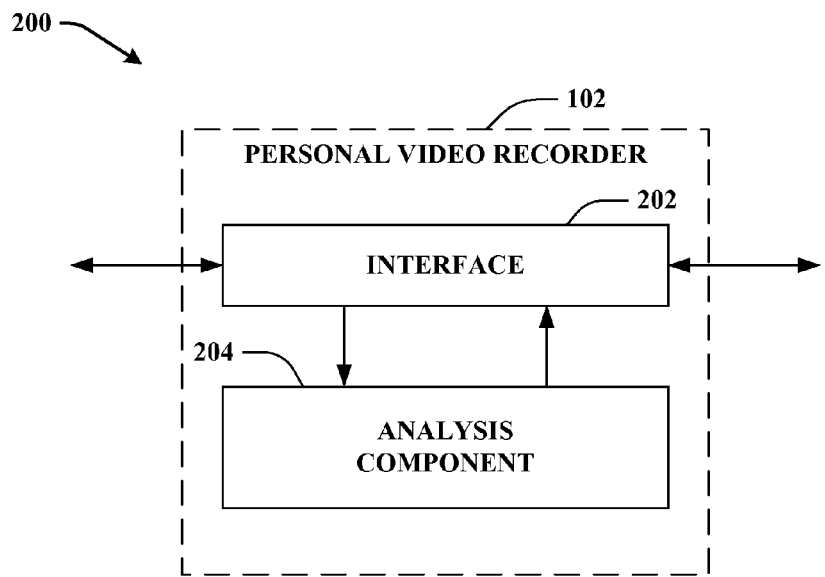
FIG. 2 provides a more detailed depiction of a personal video recorder in accordance with one aspect of the claimed subject matter.

FIG. 2 provides a more detailed illustration 200 of personal video recorder 102 that can be used in association with an aspect of the claimed subject matter. As illustrated, personal video recorder 102 can include interface component 202 (hereinafter referred to as "interface 202") that can be in continuous and/or intermittent communication with broadcast server 106 via network topology 104. Additionally, personal video recorder 102 can also include analysis component 204 that can elicit information from individual users utilizing personal video recorder 102 as to the personal preferences and/or aversions, employed multidimensional timeline techniques, artificial intelligence and/or machine learning modalities, internally and/or externally stored tables, data bases and the like, to generate and/or establish memorability profiles specific to each user employing personal video recorder 102.

Interface 202 can receive data from a multitude of sources, such as, for example, their associated with a particular multimedia presentation, client application, service, user, client, device, and/or entity involved with a particular transaction, a portion of transaction, thereafter convey the received information to analysis component 204 for further analysis. Additionally, interface 202 can receive analyze data from analysis component 204 which then can be utilized to present media content via visual display device associated with personal video recorder 102.

Interface 202 can provide various adapters, connectors, channels, communication pathways, etc. to integrate the various components included in system 200 into virtually any operating system and/or database system and/or with one another. Additionally, interface 202 can provide various adapters, connectors, channels, communication modalities, etc. that provide for interaction with various components that can comprise system 200, and/or any other component (external and/or internal), data and the like associated with system 200.

Analysis component 204 can receive multimedia audio/visual content and/or presentations from interface 202 via transmission means provided by network topology 104. Upon receipt of multimedia content, analysis component 204 can persist received content to associated storage media for later analysis. Alternatively and/or additionally, analysis component 204 can, while a multimedia presentation is being received and/or presented to a user of personal video recorder 102, perform identification, enumeration, classification, categorization, and/or undertake structural outlining of received multimedia content. Analysis component 204 can effectuate the foregoing identification, classification, categorization, and/or structural outlining of the received content by causing interface 202 solicit response from users to queries generated by analysis component 204. Responses to queries generated by analysis component 204 can pertain to individual users' likes and/or dislikes, for example.

Analysis component 204 can further employ multidimensional timeline modalities to ascertain individual users' past persisted memorable experiences, both positive and negative. Analysis component 204 can utilize persisted and/or received data, for example, from e-mails, photographs, and other similar digital documents, such as previously viewed and/or otherwise perceived media content, etc. Additionally, analysis component 204 can employ artificial intelligence, machine learning, and/or heuristic methods to determine a user's individual mnemonic profile, dynamically update a continually evolving memorability profile specific for each user of personal video recorder 102, and/or generate tags and affiliate such tags to disparate segments of the received multimedia content.

Tags that can be generated and associated with multimedia content can include metadata that imposes a hierarchical structure, ontology, and/or schema. Such metadata can include information elicited from users directly, indirectly, and/or deduced information (e.g., through use of multidimensional timeline technologies, artificial intelligence, machine learning, and/or heuristic modalities, and/or internally or externally persisted, or concurrently derived, inferred or procured sources such as databases and/or data structures). Such generated tags can be employed for subsequent search and playback purposes. Additionally and/or alternatively, tags can be utilized to generate summaries specifically adapted to each individual user's patterns of memorability and particular sensibilities. Once media clips have been associated with tag information they can be selectively played back to the user whose memorability profile maps to the tag and associated media clip.

Figure 3:
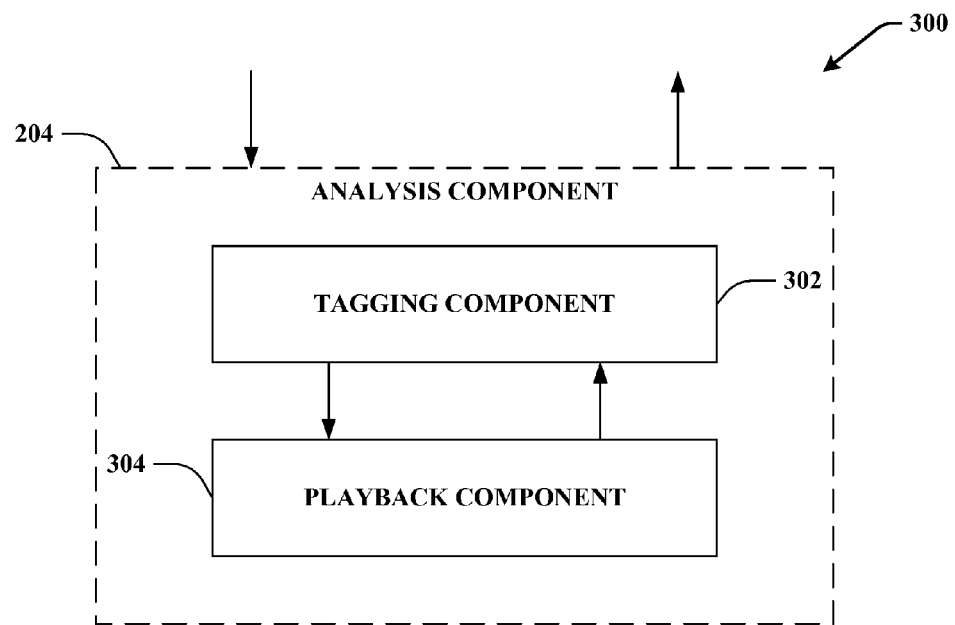
FIG. 3 provides a more detailed depiction of an illustrative analysis component that can be employed in accordance with an aspect of the claimed subject matter.

FIG. 3 provides a more detailed depiction 300 of analysis component 204. As illustrated, analysis component 204 can include tagging component 302 and playback component 304. Tagging component 302 can receive diverse multimedia segments and ascertain through use of solicitude user responses, direct and/or in direct information determined to use off artificial intelligence, machine learning, heuristics, multidimensional timeline technologies, and/or established or concurrently constructed memorability models associated with each individual user of personal video recorder 102, whether each of the received time for us multimedia segment/fragment will appeal and/or trigger a response (positive and/or negative) from the user. Additionally, tagging component 302 can aggregate the aforementioned information to construct an appropriate tag or unique signature that can thereafter be associated with the media clip.

Playback component 304 can playback annotated, tagged and persisted media content on instrumentalities associated with personal video recorder 102 (e.g., visual display, speakers, and the like). Additionally, playback component 304 can facilitate and effectuate search of persisted media content and associated tag information so that individual users can locate those aspects of the media clip that particularly appeal to their interests and sensibilities. Moreover, playback component 304 can provide appropriate summaries adapted specifically to each particular user of personal video recorder 102. Such a summarization aspect can be effectuated through utilization of generated and/or dynamically determined memorability models specific to each specific user. Thus, through use of tag and/or signature information, playback component 304 can display summary information specific to each user contemporaneously with playback of associated media segments (e.g., as a scrolling ribbon along the margins of the display).

Figure 4:
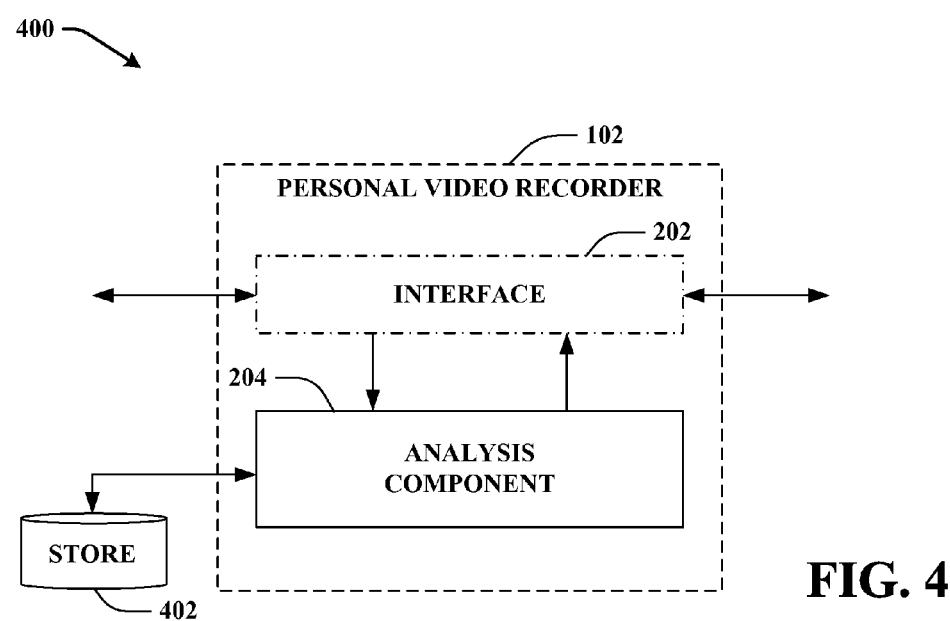
FIG. 4 illustrates a system implemented on a machine that effectuates and facilitates the selective viewing of multimedia content in accordance with an aspect of the claimed subject matter.

FIG. 4 depicts an aspect of a system 400 that effectuates and facilitates the selective viewing of multimedia content in accordance with an aspect of the claimed subject matter. System 400 can include personal video recorder 102 that can comprise interface 202 and analysis component 204. Additionally, system 400 can include store 402 that can include any suitable data necessary for analysis component 204 to analyze incoming multimedia content and to dispatch, based at least on tag or signature information, appropriate summaries and/or media segments/fragments. For instance, store 402 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 402 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 402 of the subject systems and methods is intended to comprise, without being limited to, these and any other suitable types of memory. In addition, it is to be appreciated that store 402 can be a server, a database, a hard drive, and the like.

Figure 5:
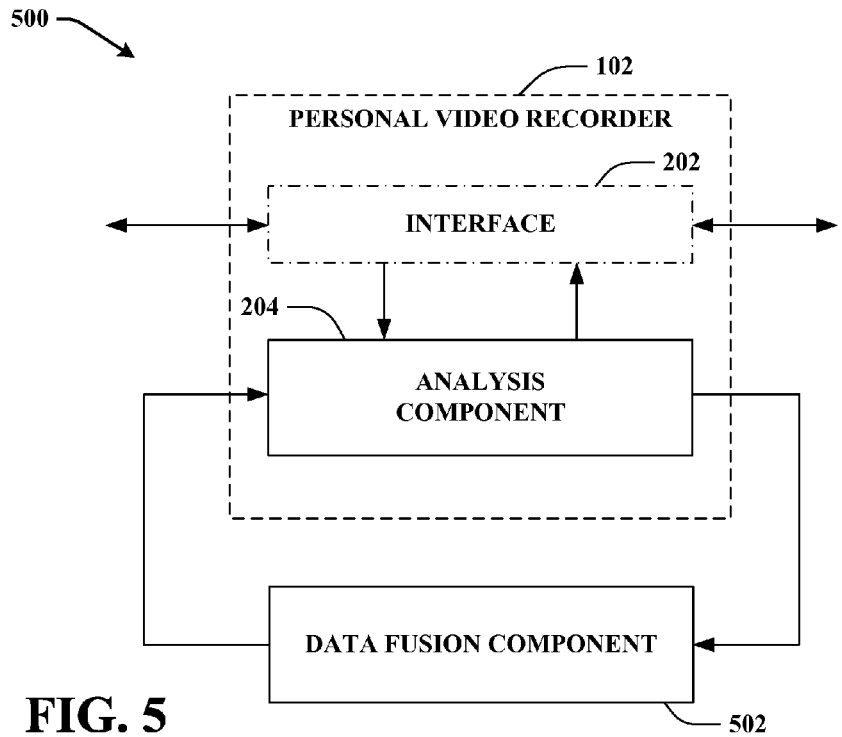
FIG. 5 provides a further depiction of a machine implemented system that effectuates and facilitates the selective viewing of multimedia content in accordance with an aspect of the subject matter as claimed.

FIG. 5 provides yet a further depiction of a system 500 that effectuates and facilitates encapsulation of metadata within tags that can be associated with multimedia segments or presentations in accordance with an aspect of the claimed subject matter. As depicted, system 500 can include a data fusion component 502 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 502 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 6:
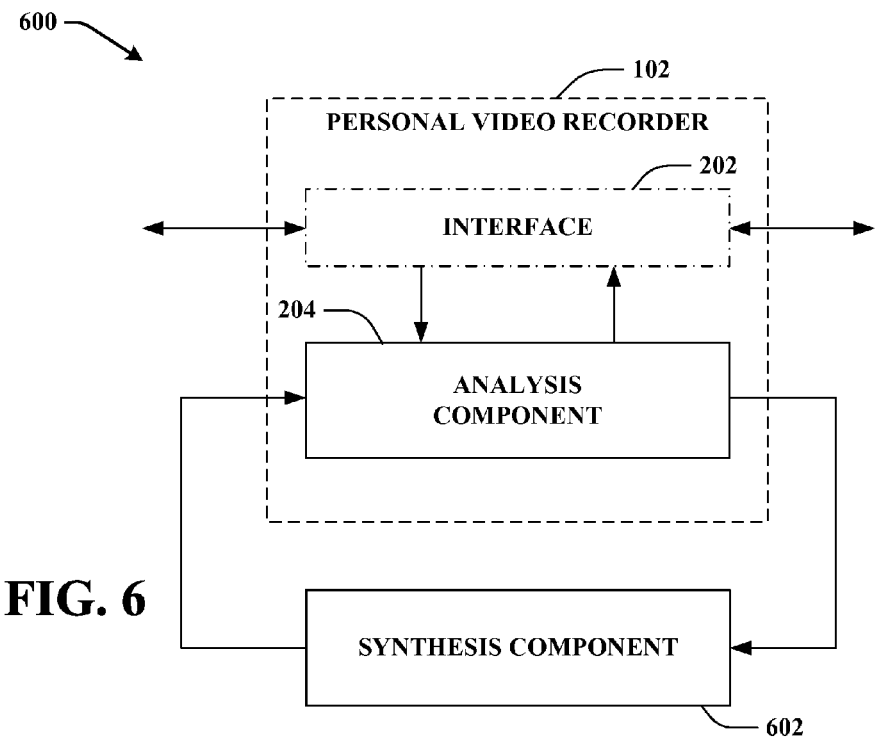
FIG. 6 illustrates yet another aspect of the machine implemented system that effectuates and facilitates the selective viewing of multimedia content in accordance with an aspect of the claimed subject matter.

FIG. 6 provides a further depiction of a system 600 that effectuates and facilitates inclusion of metadata within tags that can be associated with multimedia fragments or presentations in accordance with an aspect of the claimed subject matter. As illustrated analysis component 204 can, for example, employ synthesizing component 602 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 602 through combining and filtering can provide a set of information that can be more informative, or accurate (e.g., with respect to an entity's communicative or informational goals) than information from just one or two modalities, for example. As discussed in connection with FIG. 5, the data fusion component 502 can be employed to learn correlations between different data types, and the synthesizing component 602 can employ such correlations in connection with combining, or filtering the input data.

Figure 7:
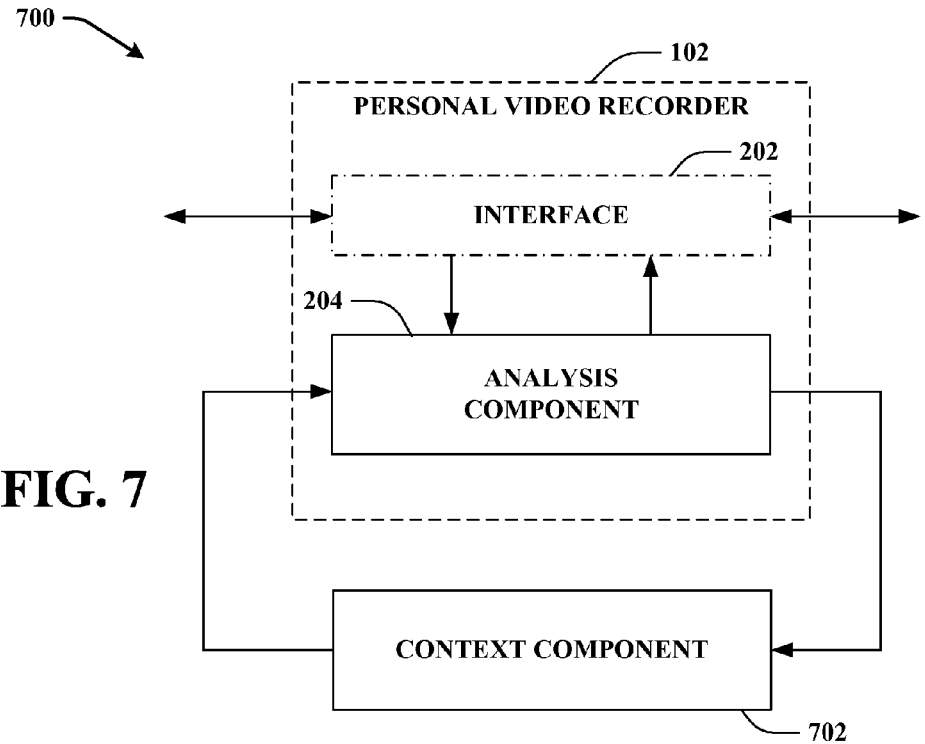
FIG. 7 depicts a further illustrative aspect of the machine implemented system that effectuates and facilitates the selective viewing of multimedia content in accordance with an aspect of the claimed subject matter.

FIG. 7 provides a further illustration of a system 700 that can effectuate and facilitate caching of metadata within tags or signatures associated with multimedia segments or presentations in accordance with an aspect of the claimed subject matter. As illustrated analysis component 204 can, for example, employ context component 702 to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 702 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 702 had knowledge that the user was not camping, and that it was near dinnertime, the utterance would be interpreted as "steak". On the other hand, if the context component 702 knew (e.g., via GPS system input) that the user recently arrived at a camping ground within a national park; it might more heavily weight the utterance as "stake".

In view of the foregoing, it is readily apparent that utilization of the context component 702 to consider and analyze extrinsic information can substantially facilitate determining meaning of sets of inputs.

Figure 8:
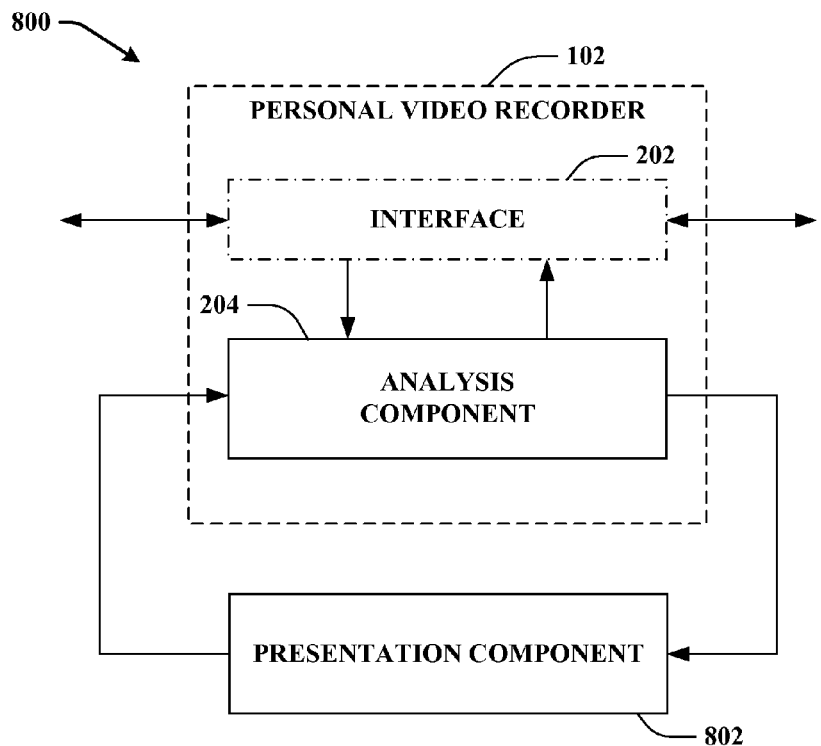
FIG. 8 illustrates another illustrative aspect of a system implemented on a machine that effectuates and facilitates the selective viewing of multimedia content in accordance of yet another aspect of the claimed subject matter.

FIG. 8 a further illustration of a system 800 that effectuates and facilitates encapsulation of metadata within signature and/or tags that can be associated with multimedia segments or presentations in accordance with an aspect of the claimed subject matter. As illustrated, system 800 can include presentation component 802 that can provide various types of user interface to facilitate interaction between a user and any component coupled to analysis component 204. As illustrated, presentation component 802 is a separate entity that can be utilized with analysis component 204. However, it is to be appreciated that presentation component 802 and/or other similar view components can be incorporated into analysis component 204 and/or a standalone unit. Presentation component 802 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into analysis component 204.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 9:
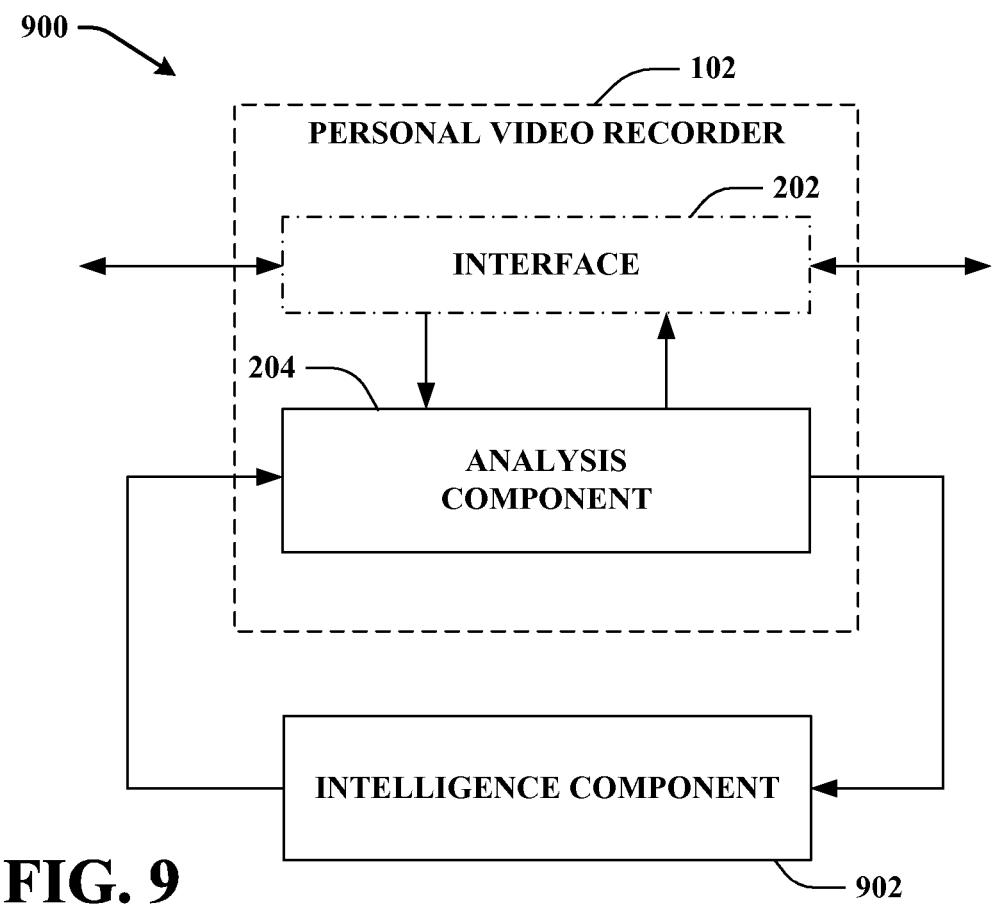
FIG. 9 depicts yet another illustrative aspect of a system that effectuates and facilitates the selective viewing of multimedia content in accordance with an aspect of the subject matter as claimed.

FIG. 9 depicts a system 900 that employs artificial intelligence to effectuate and facilitate encapsulation of metadata within tags or signatures that can be associated with multimedia segments or presentations in accordance with an aspect of the subject matter as claimed. Accordingly, as illustrated, system 900 can include an intelligence component 902 that can be utilized, for example, to dynamically ascertain one or more of threshold wait times, and/or respective locations of personal video recorder 102 and broadcast server 106. Intelligence component 902 can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 902 can employ any suitable scheme (e.g., numeral networks, expert systems, Bayesian belief networks, support vector machines (SVMs), Hidden Markov Models (HMMs), fuzzy logic, data fusion, etc.) in accordance with implementing various automated aspects described herein. Intelligence component 902 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 10:
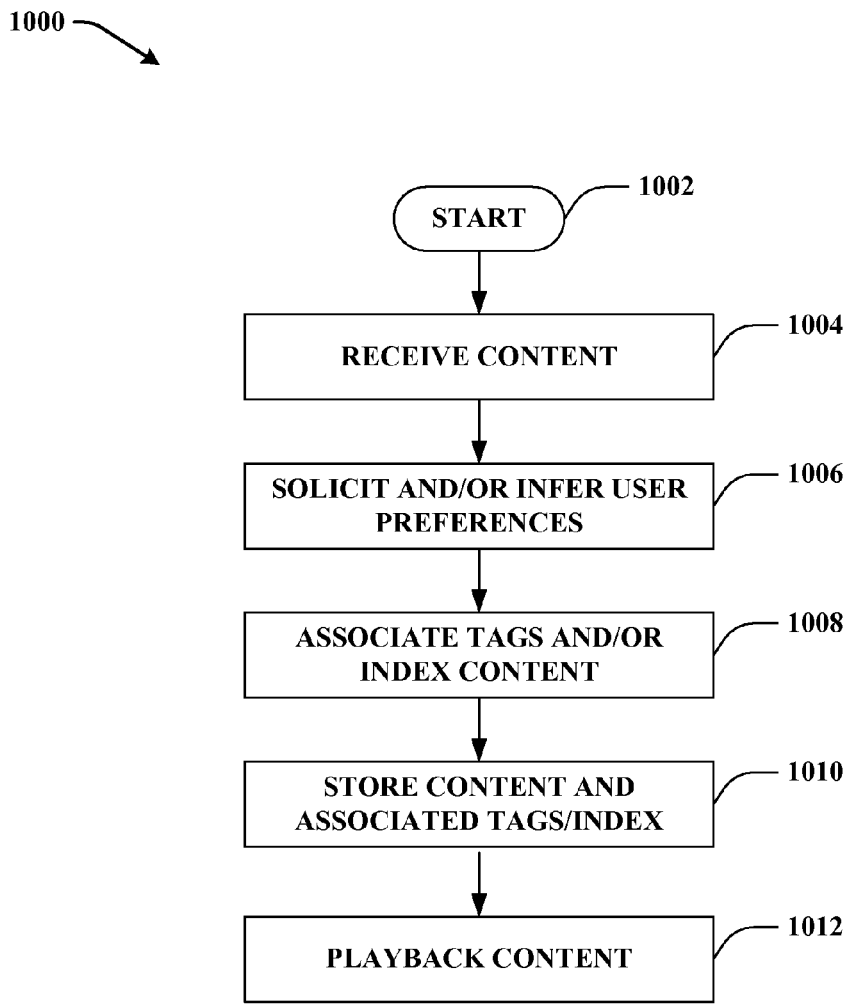
FIG. 10 illustrates a flow diagram of a machine implemented methodology that facilitates and effectuates the selective viewing of multimedia content in accordance with an aspect of the claimed subject matter.

In view of the exemplary systems shown and described supra, methodologies that may be implemented in accordance with the disclosed subject matter will be better appreciated with reference to the flow chart of FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 10 provides an illustrative flow diagram of a machine implemented methodology 1000 that effectuates and facilitates viewing of multimedia audio/visual content. At 1002 various and sundry initializations tasks and processes can be undertaken after which method 1000 can proceed to 1004. At 1004 methodology 1000 can receive and/or obtain audio/visual multimedia content from a broadcast service. At 1006 the methodology 1000 can solicit and/or infer user preferences. For example, user data/information from individual users can be elicited regarding their particular likes and dislikes, multidimensional timeline techniques can also be used wherein memorable events particular to each and every user can be utilized to associate those memorable events to a currently occurring event. Additionally, at 1006 artificial intelligence, machine learning, and/or heuristic techniques can be used to determine a user's individual mnemonic profile. At 1008 methodology 1000 can associate tags, generated signatures, and the like, with multimedia content of interest to individual users. Such tags, generated signatures, and the like can be utilized for indexing, searching, and playback of appropriate content when requested and/or required. Tags, generated signatures, and the like, can also be used to generate summaries adapted to the unique mnemonic profile and patterns of memorability associated with each and every user of the disclosed system. At 1010 methodology 1000 can store received multimedia content and associated tags/indexes to storage media. At 1012 multimedia content can be played back based at least in part on associated tags, user input, and inferred and/or determined memorability models affiliated with users of the disclosed system.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance - a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
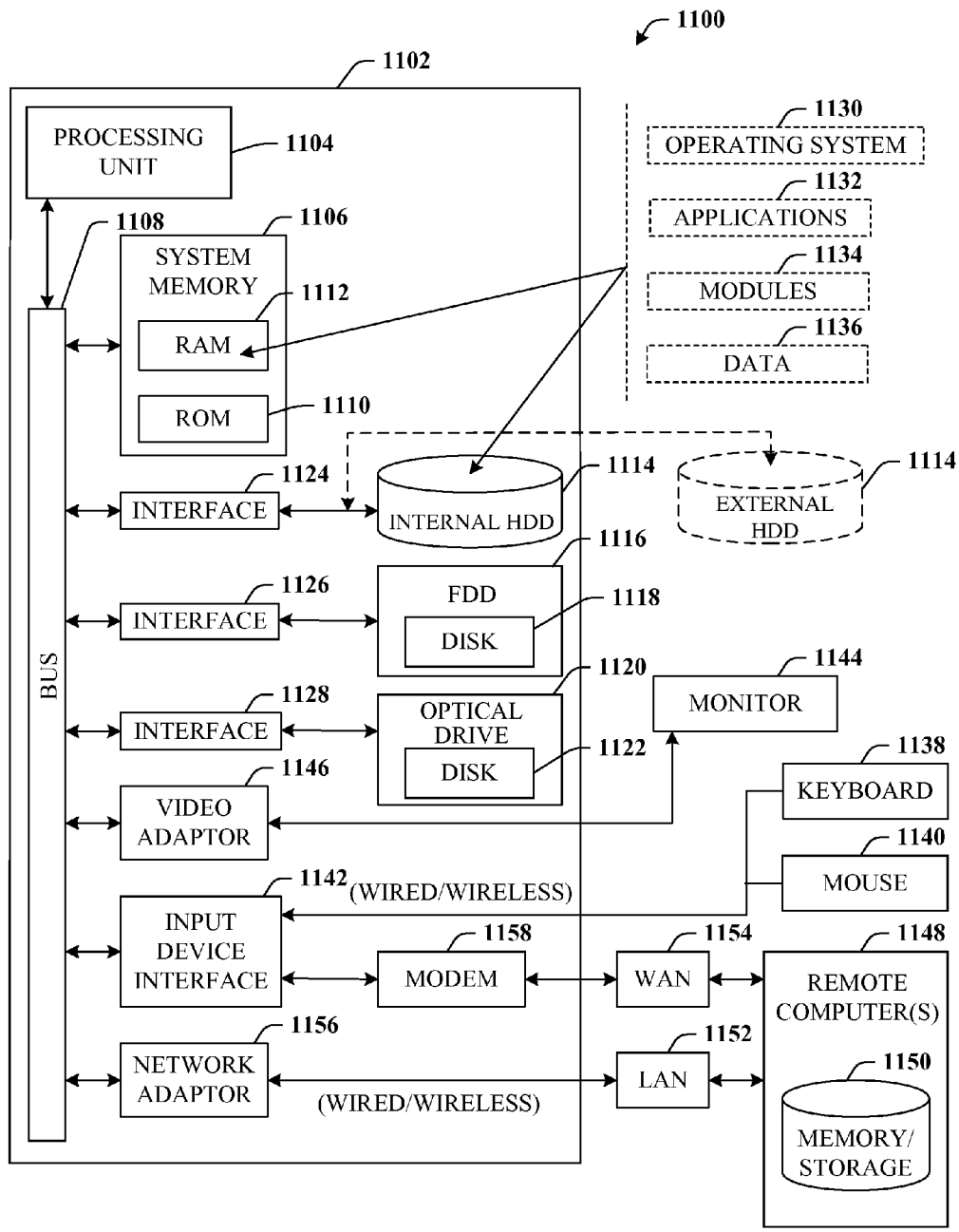
FIG. 11 illustrates a block diagram of a computer operable to execute the disclosed system in accordance with an aspect of the claimed subject matter.

Referring now to FIG. 11, there is illustrated a block diagram of a computer operable to execute the disclosed system. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 12:
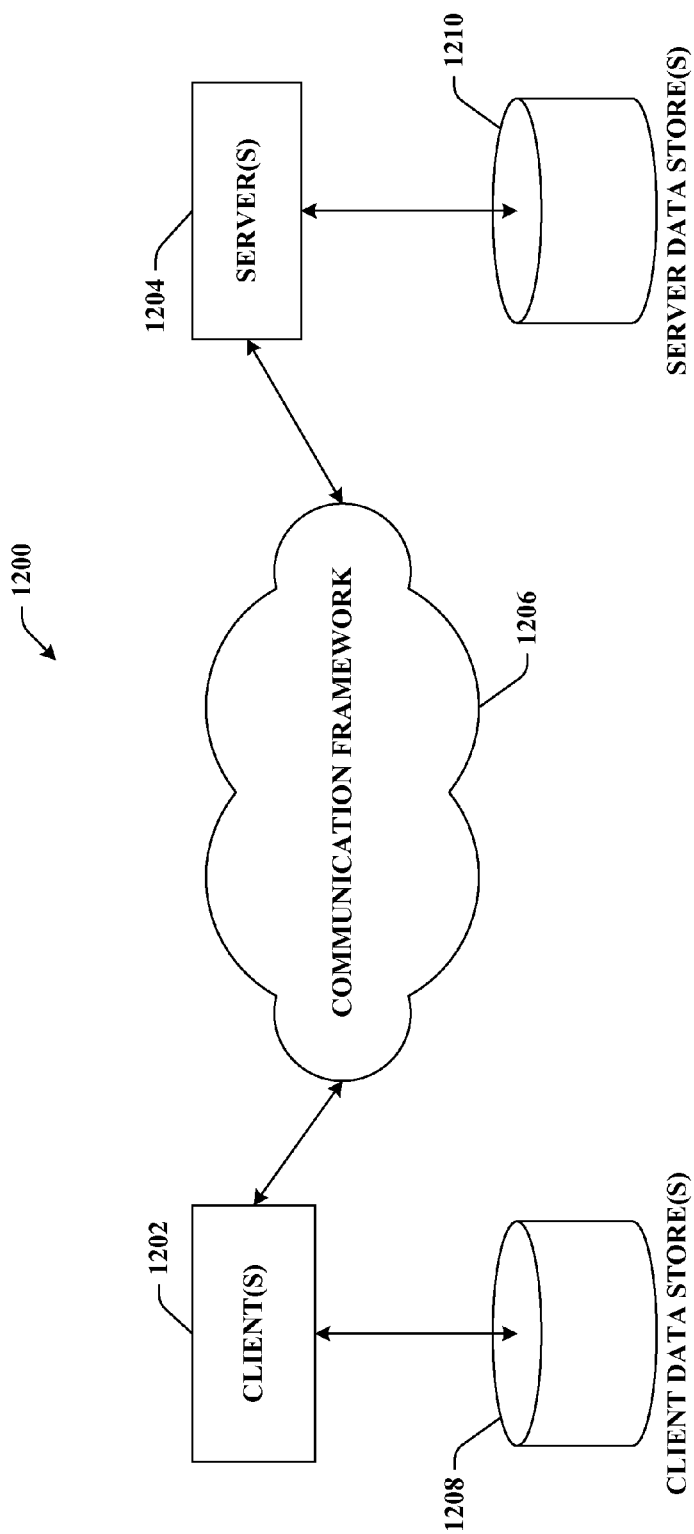
FIG. 12 illustrates a schematic block diagram of an exemplary computing environment for processing the disclosed architecture in accordance with another aspect.

Referring now to FIG. 12, there is illustrated a schematic block diagram of an exemplary computing environment 1200 for processing the disclosed architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that effectuates selective viewing of multimedia audio or visual content, comprising:
    a component that obtains the multimedia audio or visual content via an interface, categorizes the multimedia audio or visual content, associates one or more index tags to the categorized multimedia audio or visual content, and generates respective summaries of the categorized multimedia audio or visual content for display to respective users, the respective summaries generated based at least in part on a respective subset of memory stimuli employing a respective subset of mnemonic devices for each respective user, the one or more index tags associated with the respective summaries, the respective summaries displayed on a visual display associated with the component.

2. The system of claim 1, wherein the component elicits responses from at least one of the respective users regarding the at least one respective user's likes or dislikes associated with the multimedia audio or visual content.

3. The system of claim 2, wherein the elicited responses employed to construct or update a respective memorability model associated with the at least one respective user, the respective memorability model, comprising a respective subset of memory stimuli, is updated based at least in part on sensibilities of the at least one respective user as the sensibilities evolve over time.

4. The system of claim 1, wherein the component searches storage media associated with the component for digital files associated with landmark events pertinent to at least one of the respective users.

5. The system of claim 4, wherein the landmark events relate to situations that have taken place during presentation of prior multimedia audio or visual content.

6. The system of claim 4, wherein the landmark events relate to situations that take place during presentation of the multimedia audio or visual content.

7. The system of claim 4, wherein the landmark events relate to situations that occur external from the multimedia audio or visual content and selectively unique to at least one of the respective users.

8. The system of claim 1, wherein the index tags includes metadata that imposes a hierarchical structure.

9. The system of claim 8, wherein the metadata includes information solicited from the respective users, data deduced through utilization of artificial intelligence, or information retrieved from one or more databases.

10. The system of claim 8, wherein the index tags employed to search previously persisted multimedia audio or visual content to locate multimedia audio or visual fragments based at least in part on a respective memorability model, comprising a respective subset of memory stimuli, of at least one of the respective users, the multimedia audio or visual fragments utilized to stimulate the at least one respective user's recollection of a multimedia audio or visual segment missed by the at least one respective user.

11. The system of claim 1, wherein the categorized multimedia audio or visual content persisted to associated storage media.

12. The system of claim 1, wherein based at least in part on the respective subsets of memory stimuli, metadata included with the one or more index tags and associated with fragments of the multimedia audio or visual content, the respective summaries are respectively and specifically adapted to the respective users.

13. A method implemented on a machine that effectuates viewing of multimedia content, comprising:
receiving multimedia content from a broadcast service;
analyzing the multimedia content based at least in part on a first memorability model employing a first subset of mnemonic devices specific to a user, and at least one other memorability model employing at least one other subset of mnemonic devices specific to at least one other user;
associating index data with the multimedia content based at least in part on the first memorability model and the at least one other memorability model; and
utilizing the index data to concurrently playback the multimedia content, generate and display a first subset of synopsis information and at least one other subset of synopsis information that are each related to the multimedia content, wherein the first subset of synopsis information is based at least in part on the first memorability model and the at least one other subset of synopsis information is based at least in part on the at least one other memorability model.

14. The method of claim 13, further comprising:
obtaining input from at least one of the first user or the at least one other user regarding the multimedia content.

15. The method of claim 13, further comprising:
searching affiliated storage to identify digital files associated with landmark events unique to at least one of the first user or the at least one other user, respectively.

16. The method of claim 15, wherein the landmark events pertain to situations that occur during playback of the media content.

17. The method of claim 15, wherein the landmark events relate to events specific to the first user.

18. The method of claim 17, wherein the events specific to the first user include proximity to the at least one other user during playback of the media content.

19. The method of claim 13, wherein the index data includes a schema that includes information received from at least one of the first user or the at least one other user, inferred by artificial intelligence techniques, or obtained from databases.

20. A system that effectuates selective viewing of audio/visual content, comprising:
means for retrieving audio/visual content;
means for constructing and utilizing a first memorability model associated with a first user, and at least one other memorability model associated with at least one other user to analyze the audio/visual content, the first memorability model is constructed based at least in part on a first subset of memory stimuli employing a first subset of mnemonic devices and the at least one other memorability model is constructed based at least in part on at least one other subset of memory stimuli employing at least one other subset of mnemonic devices; and
means for selectively playing respective fragments of the audio/visual content based at least in part on the first memorability model, or the at least one other memorability model.

* * * * *